March 3, 1964 R. C. BRADLEY 3,123,306
APPLICATOR GUN FOR SYNTHETIC RESINS
Filed Nov. 6, 1961 7 Sheets-Sheet 1

INVENTOR
RICHARD C. BRADLEY

ATTORNEYS

March 3, 1964

R. C. BRADLEY 3,123,306

APPLICATOR GUN FOR SYNTHETIC RESINS

Filed Nov. 6, 1961

INVENTOR
RICHARD C. BRADLEY

BY
ATTORNEYS

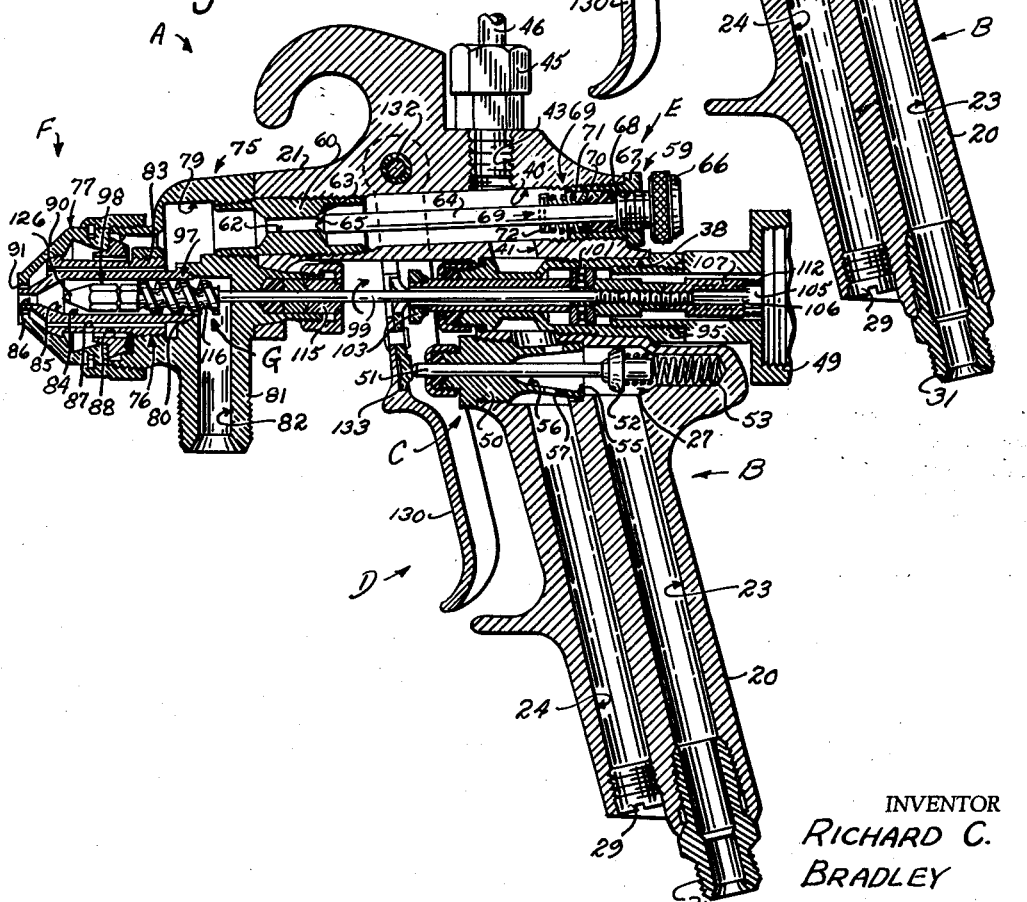

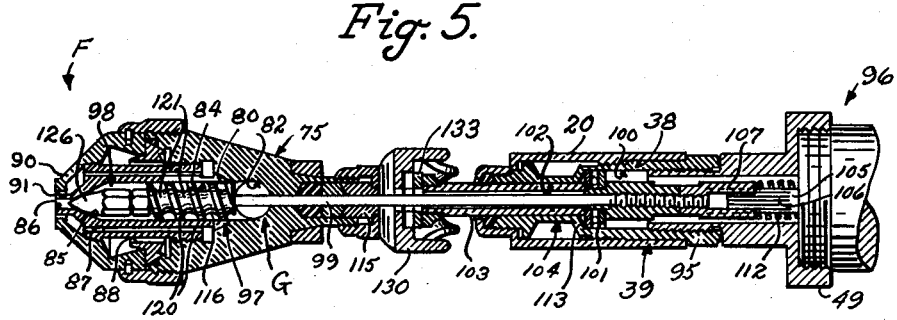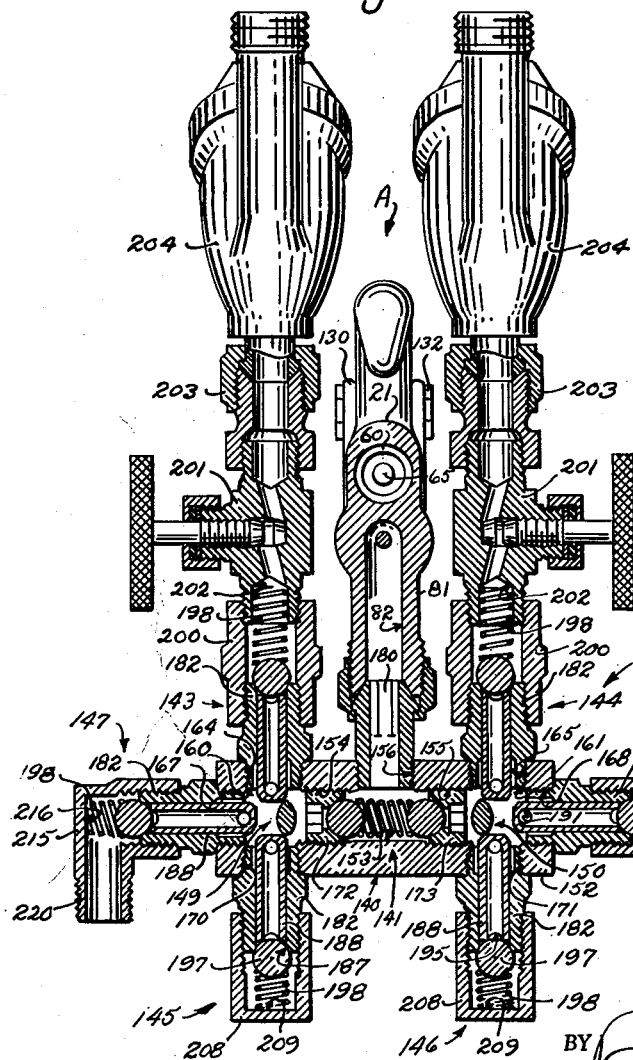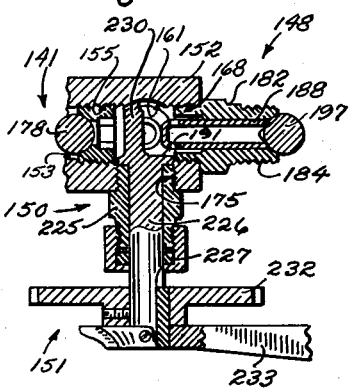

March 3, 1964 R. C. BRADLEY 3,123,306
APPLICATOR GUN FOR SYNTHETIC RESINS
Filed Nov. 6, 1961 7 Sheets-Sheet 5
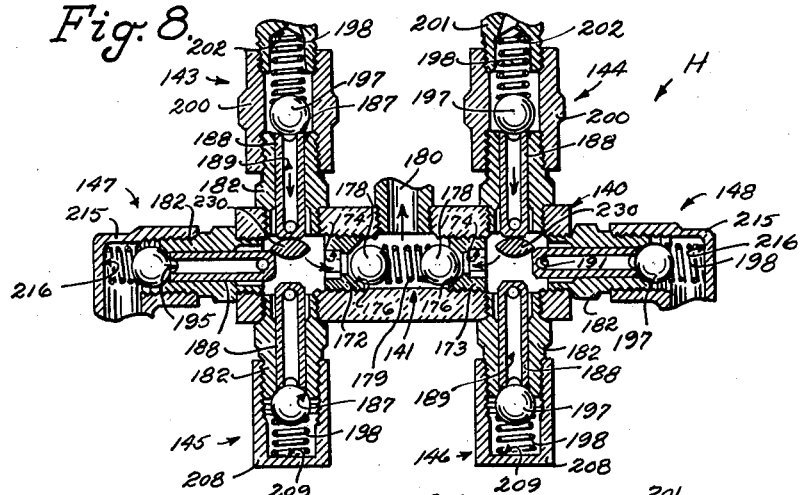
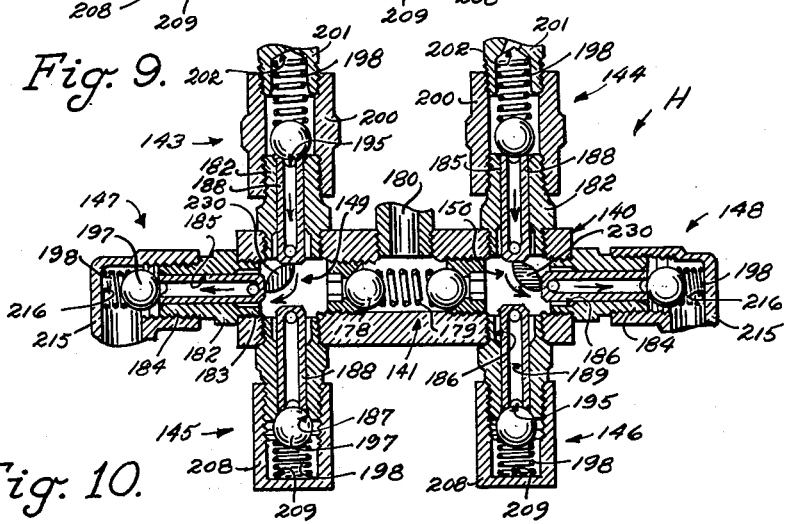
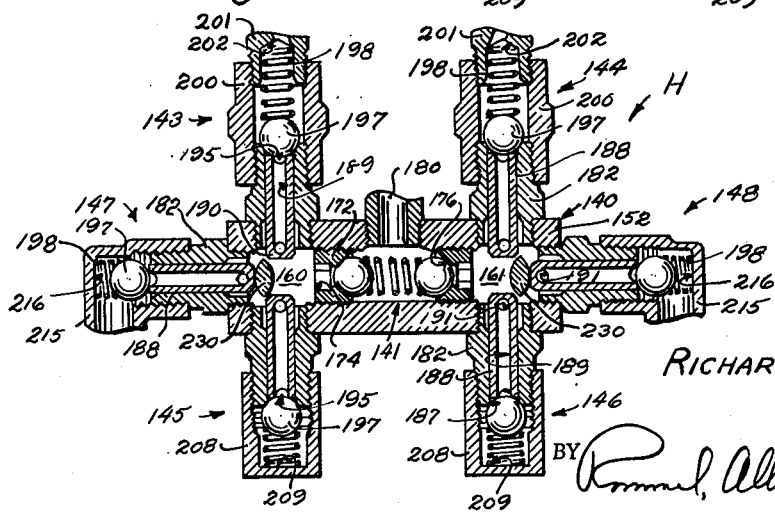
INVENTOR
RICHARD C. BRADLEY
BY
ATTORNEYS

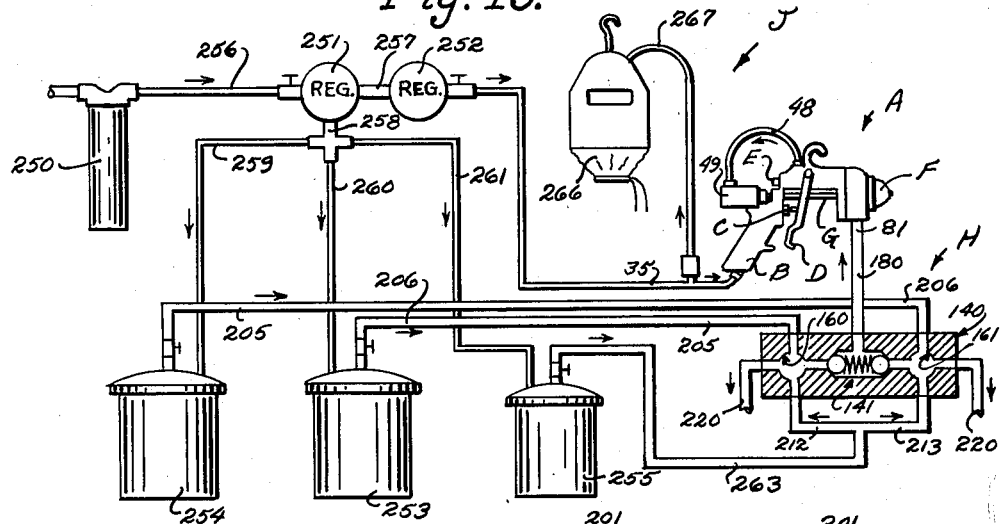
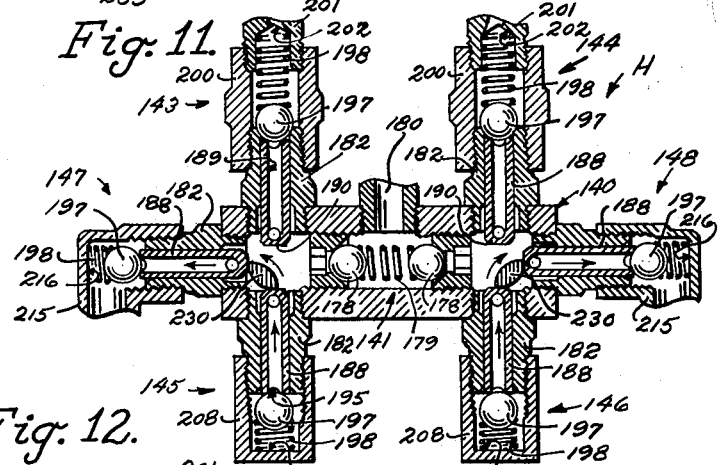
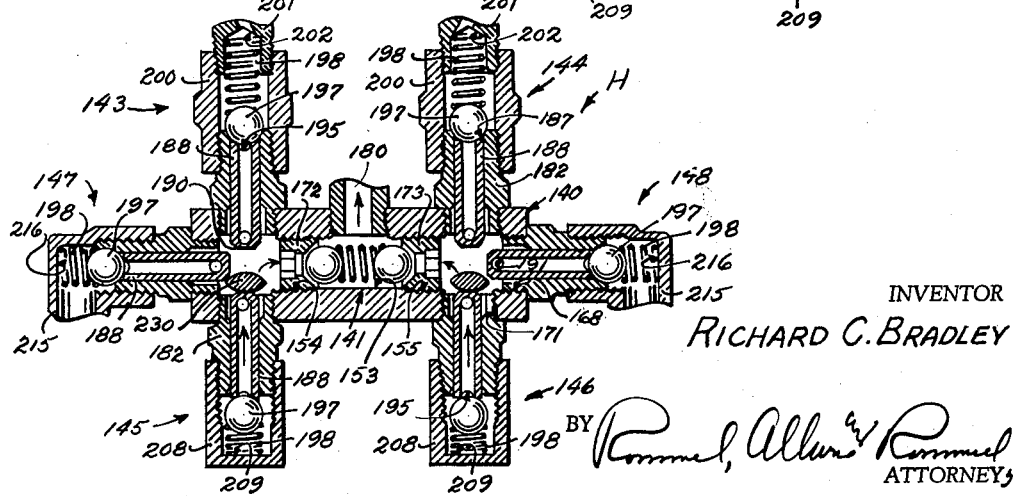

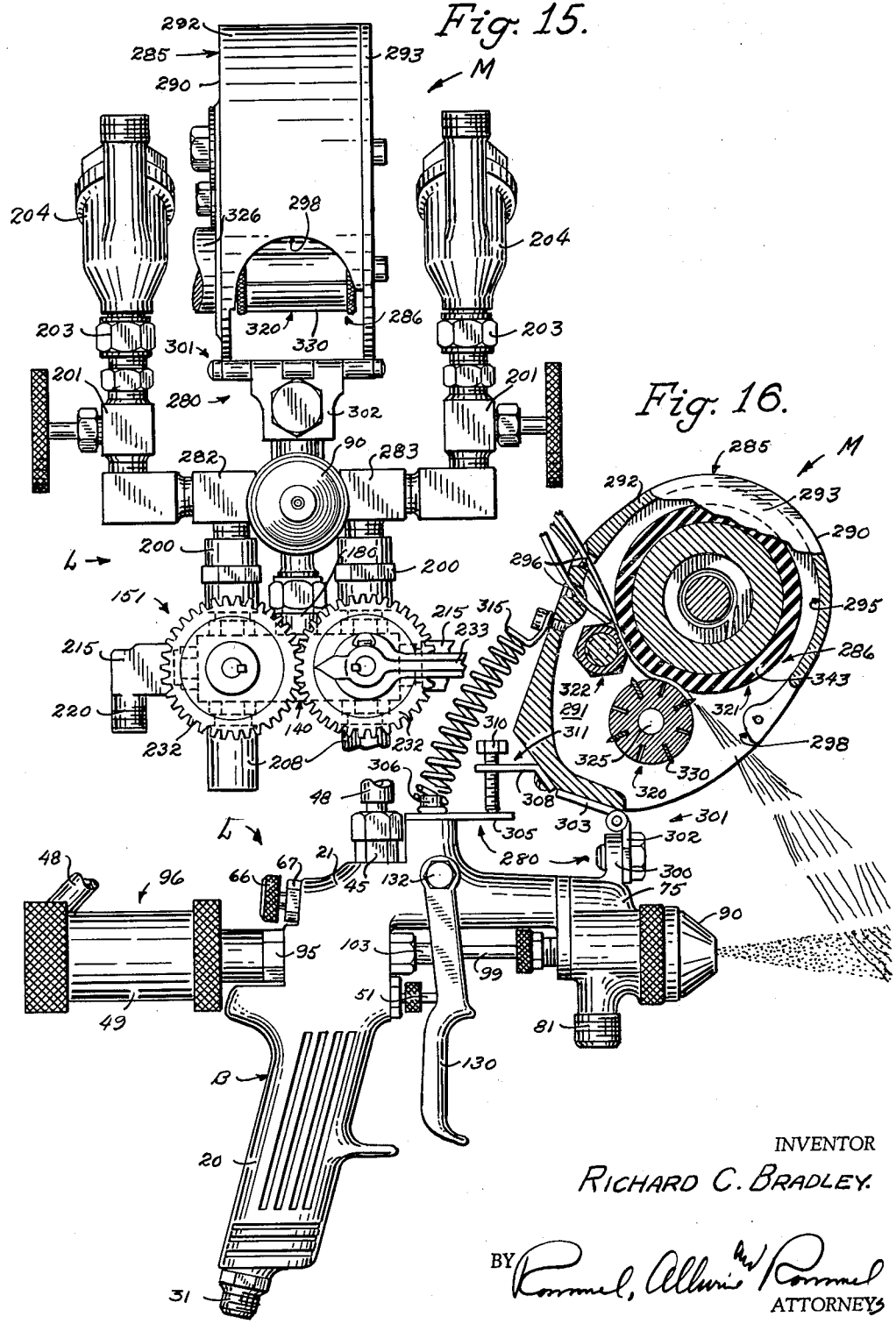

United States Patent Office 3,123,306
Patented Mar. 3, 1964

3,123,306
APPLICATOR GUN FOR SYNTHETIC RESINS
Richard C. Bradley, 3501 NW. 9th Ave.,
Fort Lauderdale, Fla.
Filed Nov. 6, 1961, Ser. No. 150,501
8 Claims. (Cl. 239—142)

This invention relates to improvements in applicator guns for synthetic resins.

In the art of molding, coating and injecting articles with synthetic resins, wherein a catalyzed and promoted resin are utilized, it is a well known fact that it is extremely difficult to manually or mechanically mix chemically reactive, plural component synthetic resins, such as urethane foams, epoxies, polyesters, etc. and to apply the intermixture prior to the time that curing reaches an advanced stage. There is a period of only a few seconds during which the intermixed catalyzed and promoted resins may be applied, before gelatinization occurs. The primary object of this invention is therefore the provision of an applicator gun for intermixing and depositing catalyzed and promoted synthetic resins.

A further object is the provision of an applicator gun for synthetic resins wherein catalyzed and promoted resins are intermixed within the gun itself, and the intermixture thereof deposited upon the article to be treated through a single nozzle.

A further object is the provision of an applicator gun for synthetic resins having improved mixing means whereby catalyzed and promoted resins may be intermixed and deposited upon the article to be treated prior to advanced gelatinization or curing of the intermixture.

A further object is the provision of an improved applicator gun for synthetic resins having improved valve means.

A further object is the provision of an applicator gun for synthetic resins providing for the intermixture of a catalyzed and promoted resin and spray depositing of the same through a single nozzle and including apparatus whereby roving or other aggregates may be introduced into the spray stream.

Other objects and advantages of the invention will be apparent during the course of the following detailed description, taken in connection with the accompanying drawings, forming a portion of this specification, and in which drawings:

FIG. 3 is an enlarged transverse sectional view taken through my improved applicator gun, substantially on the line 3—3 of FIG. 1.

FIG. 4 is a view substantially identical to FIG. 3, but with the operating parts of the gun in an activated position.

FIG. 5 is a longitudinal sectional view taken substantially on the line 5—5 of FIG. 3.

FIG. 6 is a vertical sectional view taken substantially on the line 6—6 of FIG. 3.

FIG. 7 is an enlarged vertical sectional view taken substantially on the line 7—7 of FIG. 1.

FIGS. 8, 9, 10, 11 and 12 are somewhat diagrammatic views taken through the metering valve means and showing the various operating positions thereof.

FIG. 13 is a diagrammatic view showing the preferred interconnection of my gun with the resin supply.

FIG. 15 is a front view of my improved applicator gun, modified to support a roving dispenser thereupon.

FIG. 16 is a side view of the gun of FIG. 15, with portions thereof broken away to disclose preferred details.

Figure 1:
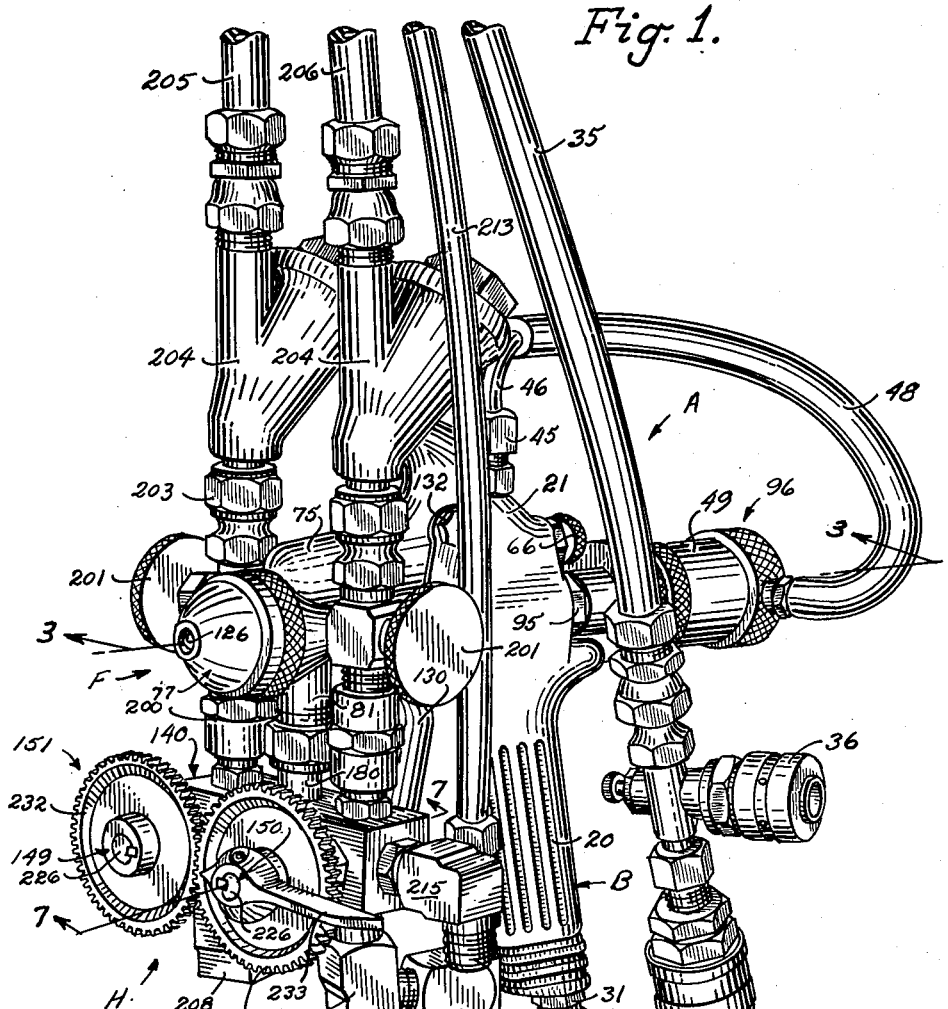
FIG. 1 is a perspective view of my improved applicator gun, looking downwardly at the front and right hand side thereof.
Figure 14:
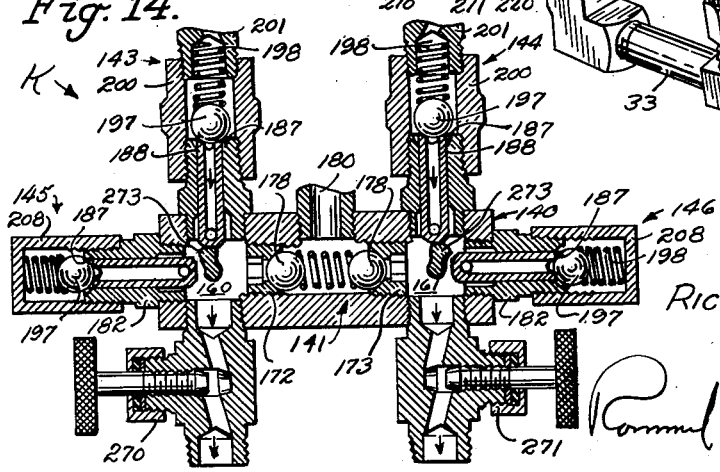
FIG. 14 is a sectional view showing a modified form of metering valve means.
Figure 2:
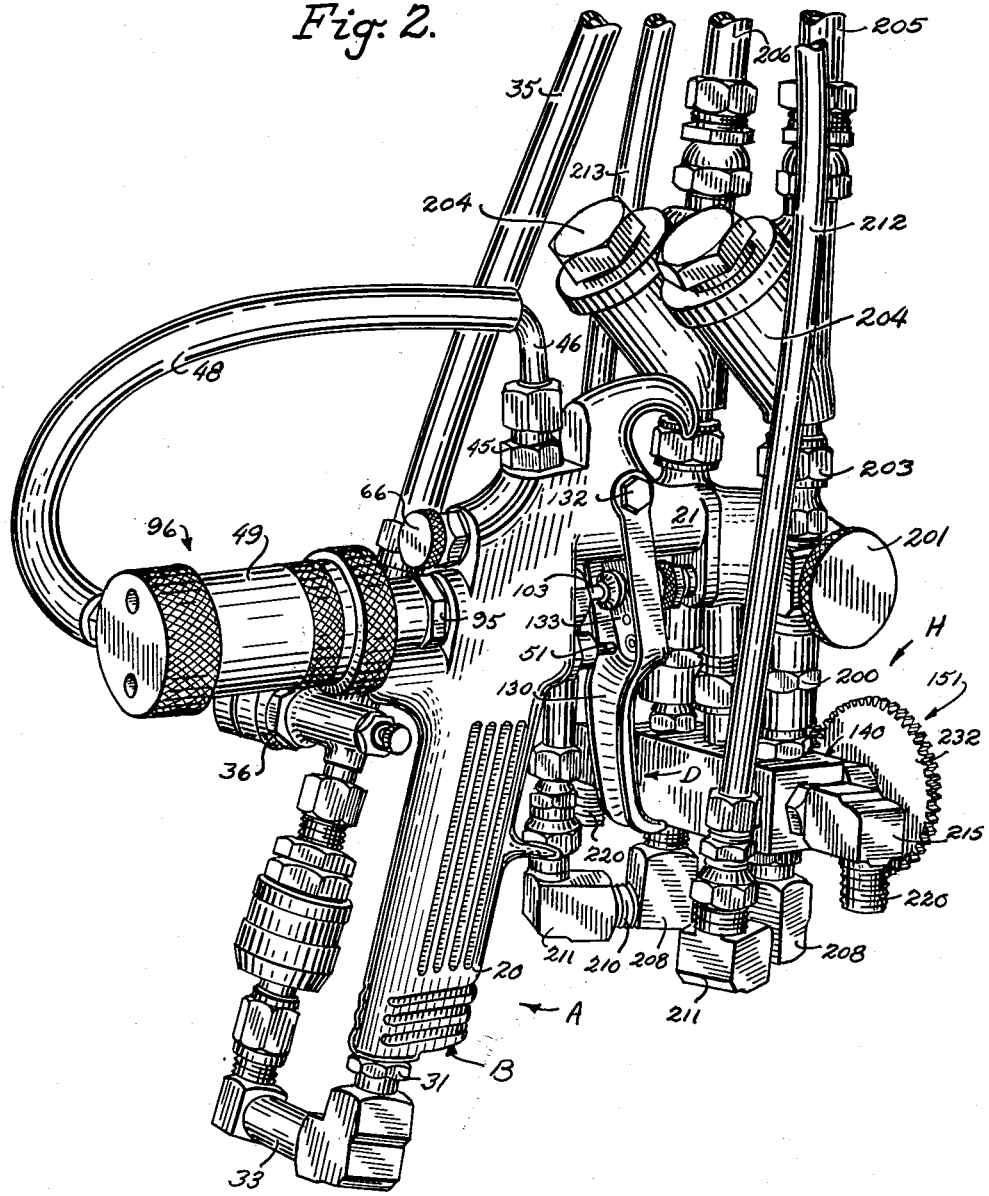
FIG. 2 is a perspective view of my improved applicator gun, looking downwardly at the rear and right hand side thereof.

In the drawings, wherein for the purpose of illustration are shown preferred and modified embodiments of the invention and wherein similar reference characters designate corresponding parts throughout the several views, the letter A may generally designate my improved applicator gun, which may include a main body portion B, valve means C, trigger means D, valve means E, nozzle means F, means G which acts as a valve means and mixing means, and metering valve means H, which applicator gun A may have a flow system J. The letter K may designate a modified metering valve means for the applicator gun A, and L a modified applicator gun having cutter means M for dispensing cut roving into the spray stream thereof.

The main body portion B preferably includes a handle portion 20 having a barrel portion 21 extendant therefrom. The handle portion 20 is provided with passageways 23 and 24 extending longitudinally therethrough. Each of the passageways 23 and 24 open at one end thereof into the chamber 27, within which chamber is received valve means C, as will be subsequently described. Passageway 24 is provided at the opposite end thereof from chamber 27 with a plug 29, and passageway 23 is provided at the opposite end thereof from chamber 27 with a hose connection 31. Suitable connecting means 33 may be secured to the connection 31, for the attachment of a hose 35 thereto. The hose 35 is interconnected to an air supply, and connecting means 33 may include a filter 36 for filtering impurities from the air prior to its introduction into the applicator gun.

A chamber 38, opening into chamber 27, is provided in the handle portion 20, to the opposite side of chamber 27 from the passageway 23 and 24. Support means 39 for rotatably and reciprocably supporting means G is provided within chamber 38, as will be subsequently described.

The barrel portion 21 is provided with an elongated chamber 40 therethrough, extendant from the handle 20, which chamber 40 receives therewithin the valve means E, as will be subsequently described. The end of the chamber 40 adjacent the handle portion 20 is provided with a passageway 41 opening into the chamber 38. The barrel portion 21 is provided with a threaded passageway 43 opening into the chamber 40 adjacent the passageway 41. The threaded passageway 43 receives a coupling 45 which supports a conduit 46, to which is attached the hose 48. The hose 48 is interconnected to an air motor 49, which air motor 49 provides rotary movement of the means G, as will be subsequently described.

Valve means C preferably includes a housing 50 secured within chamber 27, which housing 50 slidably receives and supports a shaft 51. One end of the shaft 51 extends exteriorly of the housing 50, in juxtaposition for abutment against the trigger means D, and the opposite end thereof is provided with a plunger 52. A spring 53 is mounted within the chamber 27 and abuts against the plunger 52, urging the shaft 51 into abutment with the trigger means D.

The housing 50 is provided with a mouth 55, positioned for opening and closing thereof by the plunger 52. The mouth 55 opens into passageway 23 and leads to a chamber 56 within housing 50. The chamber 56 is provided with a plurality of outlets 57, which outlets 57 open into chamber 38. Housing 50 therefore serves to divide the chamber 27 into two parts, one portion of which interconnects with the passageway 23, and the other portion of which opens into chamber 38. When the plunger 52 is seated in the mouth 55 of the housing 50, air under pressure in passageway 23 is prevented from being introduced through the housing 50 and into chamber 38, and when the plunger 52 is unseated from the opening 55, direct communication of the air from passageway 23 into the chamber 38 is permitted, through the openings 57 of the housing 50.

Valve means E is provided for controlling the atomization of fluid ejected from the nozzle means F, by regulation of the air supply introduced into the nozzle F. Valve means E preferably includes valve stem means 59 and valve seat means 60. The valve seat means 60 is mounted within the chamber 40 of the barrel portion 21, adjacent the nozzle means F, and has a passageway 62 therethrough leading from the chamber 40 and into the air receiving chamber of valve means F, as will be subsequently described. A valve seat 63 is provided at the end of passageway 62 opening into chamber 40.

Valve stem means 59 preferably includes a valve shaft 64 having a tapered portion 65 at one end thereof which seats upon the valve seat 63 in such a position so that the unseating and spacing of the tapered end 65 from the seat 63 regulates the amount of air flowing from chamber 40 through the passageway 62. Secured to the opposite end of the shaft 64 from the tapered end 65 is a threaded knob 66 which is rotatably received within valve housing 67. Valve housing 67 is secured to the barrel portion 21 and includes a threaded portion 68 into which is threaded knob 66. Sealing means 69 is mounted on the shaft 64 and abuts against the threaded portion 68, preventing air from leaking from chamber 40 through the threaded interconnection of knob 66 with housing 67. Sealing means 69 preferably includes a packing washer 70, spring 71, and stop 72. Stop 72 is secured to shaft 64, adjacent the knob 66, packing washer 70 positioned for abutment against threaded portion 68, and spring 71 positioned on shaft 64 intermediate stop 72 and packing washer 70, the spring 71 urging packing washer 70 against the threaded portion 68.

Nozzle means F preferably includes a housing 75, fluid nozzle portion 76 and air nozzle portion 77.

The housing 75 preferably includes an air receiving chamber 79, into which air is received through the passageway 62 of the valve means E, a chamfered seat portion 80, which receives the fluid nozzle portion 76, as will be subsequently described, and a conduit 81 having a passageway 82 therethrough, which passageway 82 opens at one end thereof into the seat portion 80. Metering valve means H is attached to the conduit 81, as will be subsequently described.

The fluid nozzle portion 76 is secured to housing 75 and has a body portion 83. The body portion 83 is socketed at one end thereof within valve seat 80 and extends therefrom to within the air nozzle portion 77. Body portion 83 is provided with a central passageway 84 which opens at one end thereof into passageway 82 and is tapered at the other end thereof, as at 85, to provide a restricted outlet portion 86. Body portion 83 is provided with a plurality of passageways 87 peripherally about and spaced from the passageway 84. The passageways 87 interconnect and open at one end thereof into the air receiving chamber 79 and open at the opposite end thereof adjacent the air nozzle portion 77. A second bank of air passageways 88 are provided peripherally about the body portion 83, spaced outwardly from the passageways 87, closer to the outer periphery thereof. These passageways 88 interconnect and open at one end thereof into the air chamber 79 and open at the opposite end thereof adjacent the air nozzle portion 77, short of the passageways 87.

Air nozzle portion 77 is secured to housing 75 and includes a tapered wall portion 90 which is convergent toward the restricted outlet portion 86 and is provided, adjacent the restricted outlet portion 86, with an opening 91.

Means G preferably includes a housing 95 secured within the chamber 38 of the handle portion 20, drive means 96, mixing means 97, valve means 98, and a shaft 99 interconnecting the means 96, 97 and 98.

The housing 95 is mounted in chamber 38 and has a bearing receiving chamber 100 which reciprocably supports a thrust bearing 101 and a sleeve receiving portion 102 which reciprocably supports sleeve 103. The sleeve receiving portion 102 has an exteriorly tapered portion 104 which permits air to flow from the openings 57 of the housing 50 of valve means C, through chamber 38 and into passageway 41. Shaft 99 is secured to and rotatably supported by thrust bearing 101. The air motor 49 preferably provides the drive means 96, the motor 49 having a drive shaft 105 provided with a male splined portion 106.

Mounted at one end of the shaft 99 is a female splined portion 107 which intermeshes with the male splined portion 106 of the drive shaft 105. The female splined portion 107 and the male splined portion 106 are interconnected in such a manner as to permit reciprocable movement of the female splined portion 107 along the male splined portion 106.

The sleeve 103 encircles the shaft 99, abutting at one end thereof against thrust bearing 101 and extending outwardly from the housing 95 in juxtaposition for abutment against the trigger means D. A spring 112 is secured about the drive shaft 105 and abuts against the female splined portion 107, urging the shaft 99, its thrust bearing 101 and sleeve 103 abutting the thrust bearing 101 toward trigger means D. It is to be noted that the chamber 100 of the housing 95 is restricted, as at 113, so that a stop is provided for the thrust bearing 101, limiting reciprocable movement of the actuating sleeve toward trigger means D.

The shaft 99 extends through the trigger means D and is received within the housing 75 of the nozzle means F. A packing structure 115 may be provided adjacent the entry of the shaft 99 into the housing 75, to prevent leakage from the housing 75.

Mixing means 97 of the means G is secured to the shaft 99 and extends within the chamber 84 of the fluid nozzle portion 76. As shown in the drawings, the mixing means 97 preferably comprises a longitudinally extending body portion 116 provided with right hand threads 120 and helical valleys 121. The crests of the threads 120 are machined for close fitting abutment against the walls of chamber 84, with the helical valleys 121 spaced from the walls of the chamber 84. As shown in the drawings, with the right hand threads on the mixing means 97, the shaft 99 is designed to be rotated in a clockwise direction. When such rotation is effected, by drive means 96, the fluid introduced through passageway 82 and into chamber 84 will have a reverse flow force exerted by the crests 120. Inasmuch as the fluid introduced through passageway 82 is under pressure, it will flow through the helical valleys 121, against the force exerted by crests 120, and be ejected from the restricted portion 86. The reverse flow pressure exerted by the crests 120 of the mixing portion 97 will cause a great deal of turbulence in the fluid and will cause a thorough mixing of the fluids introduced therewithin.

Valve means 98 of the means G preferably comprises a tapered nose cone 126 secured to the opposite end of shaft 97 from the drive means 96. The nose cone 126 is tapered to interfit within the taper 85 of the fluid nozzle portion 76, seating therewithin and reciprocably movable with respect thereto, for opening and closing the restricted opening 86.

Trigger means D preferably includes an elongated trigger 130 which is pivotally secured to the main body portion B, such as by the pivot stud 132. The trigger 130 has secured thereto a plate 133, mounted in juxtaposition for abutment against the shaft 51 of the valve means C, which plate 133 extends along the length of trigger 130 into juxtaposition for abutment against the sleeve 103 of the means G. The trigger 130 is freely pivotally mounted on the body portion B, it being urged toward the nozzle means F by the spring 53 of the valve means C and spring 112 of the means G.

Metering valve means H preferably includes a housing 140, double acting valve means 141, resin valves 143 and 144, solvent valves 145 and 146, discharge valves 147 and 148, cam means 149 and 150, and cam actuating means 151.

The housing 140 preferably includes a body portion 152 having a central chamber 153; a pair of threaded portions 154 and 155 to each side of the chamber 153; a threaded opening 156 opening into chamber 153; chambers 160 and 161 disposed to either side of the threaded portions 154 and 155; upper threaded openings 164 and 165, the threaded opening 164 opening into the chamber 160 and the threaded opening 165 opening into chamber 161, a pair of threaded openings 167 and 168 opening into the sides of chambers 160 and 161, the threaded opening 167 opening into chamber 160 and the threaded opening 168 opening into chamber 161; a pair of lower threaded openings 170 and 171 opening into the chambers 160 and 161, the threaded opening 170 opening into chamber 160 and the threaded opening 171 opening into chamber 161; and a pair of cam receiving threaded openings 175 one of which opens into chamber 160 and the other of which opens into chamber 161.

Double acting valve means 141 preferably includes a pair of valve seat means 172 and 173 which are respectively secured within the housing 140 at the threaded portions 154 and 155. The valve seat means 172 and 173 preferably each include a passageway 174 leading from chamber 153, the passageway 174 of valve 172 opening into chamber 160 and the passageway 174 of valve 173 opening into chamber 161. The valves 172 and 173 are each provided with a seat 176, each of which receive a ball 178. A spring 179 abuts against each of the balls 178, to the opposite side thereof from their seating engagement with valves 172 and 173, urging the balls 178 into respective engagement with the seats 176 of the valves 172 and 173.

Threaded portion 156, which opens into the chamber 153, receives a conduit 180 which is secured to the conduit 81 of the nozzle means F, so that fluid received within the chamber 153 may be discharged through the passageway 82 of the nozzle means F.

Valves 143, 144, 145, 146, 147, and 148 are identical, and like reference characters will therefore be applied to each. Each of these valves preferably include a main body portion 182 having threaded portions 183 and 184 to each side thereof and a passageway 185 therethrough. Passageway 185 is provided with a cam receiving opening 186 adjacent threaded portion 183, and the outermost end of threaded portion 184 is provided with a seat 187. A sleeve 188 is slidably mounted in the passageway 185, extending therethrough from the cam receiving opening 186 to the seat 187.

The sleeve 188 has a passageway 189 therethrough, passageway 189 being closed at one end thereof, as at 190, adjacent the cam receiving opening 186, and open at the other end thereof, adjacent seat 187. An opening 191 is provided through the sleeve 185, leading into passageway 189 transverse to the axis thereof. The opening 191 is disposed adjacent the closed end 190 of passageway 189 and opens from passageway 189 into either the chamber 160 or 161, dependent upon the location of the particular valve. The open end of the sleeve 185 is provided with a notched portion 195, for a purpose which will be subsequently described. The ball 197 is mounted in juxtaposition with respect to the body portion 182 to interfit within the seat 187 thereof, and is spring urged, as by spring 198, into engagement with the seat 187.

Engagement of the respective cam means 149 and 150 with the closed end 190 of a sleeve 188 will cause the sleeve 188 to slide within the passageway 185 and lift the ball 197 from its seat 187, so that fluid is permitted to flow into the valve from the housing 140, through the opening 191, through passageway 185, past the ball 197, through the notch 195, and into the conduit attached to the valve.

Resin valves 143 and 144 are respectively secured within the threaded opening 164 and threaded opening 165 of the body portion 150, and respectively open into chamber 160 and chamber 161; solvent valves 145 and 146 are respectively secured within threaded opening 170 and threaded opening 171 of the body portion 150 and respectively open into chamber 160 and chamber 161; and valves 147 and 148 are respectively secured within threaded opening 167 and threaded opening 168 of the body portion 150, the valves 167 and 168 respectively opening into chamber 160 and chamber 161.

Valves 143 and 144 each have secured thereto a coupling 200 which is attached to a needle valve 201, the needle valve 201 having a seat portion 202 which provides a seat for the spring 198 of the respective valve to which it is secured. The needle valves 201 are conventional in construction, and are provided for manually cutting off the flow of fluid leading into the valves 143 and 144. Suitable couplings 203 may be secured to each needle valve 201, which couplings 203 are in turn secured to conventional filters 204, which filters 204 are secured to conduits 205 and 206, the conduit 205 discharging into the valve 143, and the conduit 206 discharging into the valve 144. The filters 204 are provided for removing impurities from the fluid which may flow through the conduits 205 and 206 to their respective valves 143 and 144. The needle valves 201 permit regulation of the fluid volume of flow into their respective valves 143 and 144 so that various proportions of fluid from conduits 205 and 206 may be permitted to flow into their respective valves 143 and 144.

The valves 145 and 146 each include a coupling 208 having a side portion 209 against which the respective springs 198 thereof abut, each of the couplings 208 being provided with an outlet portion 210 to which may be attached a coupling 211. The coupling 211 of the valve 145 is attached to a conduit 212, and the coupling 211 of the valve 146 attached to a conduit 213, providing for flow of fluid into the respective valves 145 and 146.

Valves 147 and 148 each preferably include a coupling 215, which coupling 215 includes a wall portion 216 against which the respective springs 198 of the valves 147 and 148 may abut, the couplings 215 open into the valves 147 and 148 and have discharge conduits 220 leading externally therefrom.

Cam means 149 extends to within chamber 160, and cam means 150 extends to within chamber 161. Each of the cam means 149 and 150 preferably include a housing 225 which is secured to the housing 140 in the threaded portion 175 thereof, which housing 225 rotatably supports a cam shaft 226. A suitable seal 227 may be secured to the housing 225, engaging the shaft 226 for preventing leakage of fluid from the housing 140. Each cam shaft 226 extends to within its respective chamber 160 or 161, and is provided with a cam 230 within such chamber. The cam is of such a configuration as to operatively abut the sleeve 185 of the valves 143, 144, 145, 146, 147, and 148, which it is desired to activate, as illustrated in the drawings, and as will be subsequently described. Each cam shaft 226 is provided at the opposite end thereof from cam 230 with the gear 232, the gears 232 engage and enmesh with each other, as shown in FIG. 1. One of the shafts 226 is longer than the other, and is provided with a handle portion 233 for rotation thereof. The cams are positioned within the housing 140 so that they may be simultaneously actuated by movement of the handle 233.

It is to be noted that the seat means 172 and 173 of double acting valve means 141 are preferably of smaller diameter than the threaded openings 167 and 168 to which valves 147 and 148 are connected, so that the seat means 172 and 173 may be respectively inserted through the threaded openings 167 and 168 and into threaded engagement with their respective threaded portions 154 and 155 within the housing 140. It is likewise to be noted that the spring 179 of the double acting valve means 141 is preferably weaker than the springs 198 of the valves 143, 144, 145, 146, 147, and 148, for a purpose which will be subsequently described.

The metering valve means H is shown in a neutral position in FIGS. 6 and 7, with the cam 230 of the cam means 149 and 150 being adjacent the double acting valve means 141. In this position the cams 230 of the cam means 149 and 150 are out of contact with valves 143, 144, 145, 146, 147 and 148.

In FIG. 8 the cam means 149 and 150 have been shown with their respective cams 230 rotated into abutment with the sleeves 188 of valves 143 and 144. In this position the fluid discharged through valves 143 and 144, which fluid will be under pressure, will flow from the respective valves 143 and 144 into the respective chambers 160 and 161 of the housing 140, urging the balls 178 of the double acting valve means 141 away from their seats 176, compressing the spring 179, and permitting simultaneous flow of fluid from the chambers 160 and 161 through conduit 180 and into the chamber 82. This is the position at which the cam means 149 and 150 will be placed when it is desired to simultaneously feed resin from the conduits 205 and 206 into the passageway 82. Inasmuch as the spring 179 of double acting valve means 141 is weaker than the springs 198 of valves 145, 146, 147, and 148, fluid flow will be through double acting valve means 141 and pressure within chambers 160 and 161 will be relieved so that it is insufficient to open valves 145, 146, 147 or 148.

In FIG. 9 the cam means 149 and 150 have had their cams 230 thereof rotated so that the cam 230 of cam means 149 is in abutment with the sleeves 188 of both valve means 143 and 147, opening each of these valves, and the cam 230 of cam means 150 is in abutment with the sleeves 188 of the valves 144 and 148, opening these valves. In this position, the fluid flow from conduit 205 will be discharged from valve 143 and through valve 147, and the fluid flow through conduit 206 will be discharged from valve 144 and through valve 148. The cam means 149 and 150 are moved into this position when it is desired to check the fluid flow through the conduits 205 and 206, and may be utilized for taking a sample of the respective fluids flowing through these conduits.

In FIG. 10, is shown another neutral position of the cam means 149 and 150. In this position the respective cam 230 of the cam means 149 and 150 will be respectively abutting the sleeves 188 of valves 147 and 148. However, inasmuch as there is no fluid pressure flow through valves 147 and 148, this is a neutral position.

In FIG. 11 is shown the positioning of the cam means 149 and 150 for flushing of the valves 147 and 148. In this position the cam 230 of cam means 149 abuts the sleeves 188 of valves 145 and 147 and cam 230 of cam means 150 abuts the sleeves 188 of valves 146 and 148, so that the solvent mixture introduced through the valves 145 and 146 will be ejected through valves 147 and 148, flushing any residue resin therefrom.

In FIG. 12 is shown the position of the cam means 149 and 150 for flushing the gun. In this position the cams 230 of cam means 149 and 150 abut the sleeves 188 of the valves 145 and 146, permitting fluid flow of the solvent through their respective valves 145 and 146, into the double acting valve means 141, and into the passageway 82 of the gun A. As previously discussed when describing FIG. 8, fluid flow through double acting valve means 141 prevents buildup of pressure within chambers 160 and 161, so that valves 143, 144, 147 and 148 remain closed.

As shown in FIG. 13 flow system J preferably includes an air pressure supply tank 250, pressure regulators 251 and 252, resin supply tanks 253 and 254, one of which will contain a catalyzed resin and the other of which will contain a promoted resin, and a solvent tank 255. A conduit 256 leads from the pressure tank 250, into regulator valve 251, which regulator valve is provided with a conduit 257 leading into regulator valve 252 and a T connection 258 to which are secured conduits 259, 260 and 261, the conduit 259 leading to tank 254, the conduit 260 leading to tank 253, and the conduit 261 leading to tank 255. In this manner, identical pressures are exerted upon the fluids in the tanks 253, 254 and 255, for supplying fluid under identical pressure to the gun A. As shown in the drawings, conduit 205 leads from tank 253 into the valve 143, conduit 206 leads from tank 254 into valve 144, and tank 255 is provided with a conduit 263 which leads into conduits 212 and 213, which respectively lead to valves 145 and 146.

Pressure regulator valve 252 leads into conduit 35, for supplying air pressure to the gun A. A separate regulator valve 252 is provided in the event that it is desired to provide air under pressure to the gun A at a pressure different from that which is supplied to the tanks 253, 254, and 255. An operator's mask 266 may have a conduit 267 leading therefrom and tying into conduit 35, for supply of air to the operator, so that he does not have to breathe the fumes that may be generated during the spraying process.

The pressure in conduit 35 will usually be the same as the pressures of the fluid in tanks 253, 254, and 255, however, it may be desirable, under some circumstances, to increase or decrease the pressure in conduit 35, such as when a more finely divided or a thicker spray stream from the gun A is desired.

In operation, the promoted resin and catalyzed resin will be placed within the respective tanks 253 and 254, tank 255 filled with a solvent, and air under pressure released from the pressure tank 250, through regulator valves 251 and 252, to the respective tanks 253, 254 and 255, and to the gun A. I have discovered that a suitable air pressure for most operations is 30 p.s.i. At this stage of the operation, the cam means 149 and 150 are in neutral, as shown in FIGS. 6 and 7, or as shown in FIG. 10. The cam means 149 and 150 will now be activated into the position as shown in FIG. 9, at which time samplings of the respective resin mixtures may be taken in order to ascertain that they are properly flowing through the conduits 205 and 206. The needle valves 201 will normally be in a fully open position, providing identical fluid volume of flow from conduits 205 and 206. One or the other of these needle valves 201 may be partially closed in the event that it is desired to have a greater fluid volume of flow through one or the other of the conduits. Inasmuch as the pressure on the fluid flowing through conduits 205 and 206 are identical, the regulation of the needle valves 201 will determine the fluid volume flow through these conduits and into the metering valve means H.

After it has been determined that the fluid resin supply is as desired, cam means 149 and 150 will be activated into the position as shown in FIG. 8. When the metering valve H is in this position, the fluid flow will be through the conduits 205 and 206, through resin valves 143 and 144, through the double acting valve means 141, through conduit 180, and into the passageway 82 of the gun A.

The spraying operation may now be started, by depression of the trigger 130 toward the handle 20. The depression of trigger 130 will activate valve means C and means G, which acts as a valve means and mixing means. The knob 66 of valve means E is adjusted to provide the proper air pressure feeding the nozzle means F, and to provide suitable back pressure for the desired operation of the air motor 49. When the trigger 130 is depressed, toward the handle 20, air flows through passageway 23, past plunger 52, through the mouth 55 and into chamber 56, through openings 57, through chamber 38, through passageway 41 and into chamber 40. A portion of the air will flow from chamber 40, through conduit 48 and drive motor 49, which will rotate the shaft 99 of means G. The remainder of the air will flow through chamber 40, through the passageway 62 of valve seat means 60, into chamber 79 of the nozzle means F, through the respective passageways 87 and 88 of nozzle 76, and through opening 91.

Simultaneously with the flow of air as above described, the fluid will flow through passageway 82, into abutment with the rotating mixing means 97, being forced through the helical valleys 121 in a reversed direction from the force exerted by the threads 120, into passageway 84 and outwardly through the restricted outlet 86.

When the trigger 130 is released, plunger 52 is seated in opening 55, cutting off the air supply, and simultaneously therewith the nose cone 126 will be seated within the taper portion 85 of the fluid nozzle 76, cutting off ejection of the resin supply from the gun A.

After the desired spraying operation has been accomplished, cam means 149 and 150 are rotated to the position as shown in FIG. 11, which will cause the solvent to flow through valves 147 and 148, cleaning the same of any resin which may have any residue resin which may have been left therein. The cam means 149 and 150 are then rotated to a position as shown in FIG. 12, which permits discharge of the solvent into the gun A, and the trigger 130 is depressed, permitting flow of the solvent through the gun A, in the same manner as the resin flowed therethrough.

The modified metering valve K is substantially identical to the metering valve H, except that the solvent valves 145 and 146 are disposed to either side of the housing 140, in place of valves 147 and 148, and manually operated needle valves 270 and 271 are respectively secured to the housing 140 for respective discharge from the chambers 160 and 161. The cams 230 of the cam means 149 and 150 may likewise be somewhat modified to provide a cam 273. Insofar as the parts of metering valve means H and K are identical, identical reference characters have been applied. Provision of metering valve means K will eliminate the likelihood of any drainage of the solvent or the resin from the metering valve means by a weakening of the springs 198. In this form, it will be observed that the balls 197 of each of the valves 143, 144, 145, and 146 are under identical pressures, urging them into a seating relationship with respect to their seats 187, so that there is no likelihood whatsoever of any of these valves being inadvertently opened by a weakening of the spring pressure, and these valves can only be opened by actuation of the cam means 149 and 150.

Modified applicator gun L is substantially identical to the applicator gun A, and identical reference characters have been applied thereto insofar as they are identical. The gun A is modified only to the extent of providing attaching means 280 for the cutter means M, and in the addition of couplings 282 and 283 intermediate the needle valves 201 and couplings 200 leading from conduits 205 and 206, whch permits spacing apart of the needle valves 202 and the filters 204 a sufficient distance so that the cutter means M may be mounted on the barrel portion 21 of the gun.

The cutter means M may be substantially identical to that of my copending application Serial No. 134,650, filed August 29, 1961, including a housing 285 and feeding and cutting means 286. The housing 285 of the cutter means M preferably includes a body portion 290 having a main wall 291 and side wall 292 extending normally therefrom. A cover plate 293 may be provided for the body portion 290. The wall 291, side wall 292 and cover plate 293 define a chamber 295 within which is received the feeding and cutting means 286. The side wall 292 is provided with a plurality of openings 296 for the feeding of strands of roving to within the chamber 295. The wall 292 is also provided with a discharge opening 298 through which cut roving may be ejected.

The nozzle means F of the applicator gun L is provided with attaching means 280, which includes a flange 300 to which may be secured hinge means 301, the hinge plate 302 of the hinge means 301 being secured to the flange 300 and the hinge plate 303 of the hinge means 301 being secured to the wall 292 of the housing 285.

Attaching means 280 likewise includes a supporting plate 305 secured to the barrel portion 21 of the gun L, the supporting plate 305 having a lug 306 extending upwardly therefrom, for a purpose which will be subsequently described. A plate 308 is secured to the wall 292 of the housing 285, and a bolt 310 is threaded through the plate 308 in juxtaposition for abutment against the supporting plate 305. The supporting plate 305, plate 308 and bolt 310 comprise a cam means 311 whereby the housing 285 may be angularly positioned about the hinge means 301 so that opening 298 through which the cut roving is ejected may be angularly varied with respect to the jet stream issuing through the nozzle means F.

A spring 315 is secured at one end thereof to the housing 285 and at the other end thereof to lug 306, the spring 315 urging the bolt 310 into abutment with the supporting plate 305.

Feeding and cutting means 286 preferably includes a cutter roller 320 and a pair of idler rollers 321 and 322. The cutter roller 320 is rotatably supported within the chamber 295 of the housing 285 and includes a shaft 325 which is rotatably driven by an air motor 326. Air for driving the air motor 326 may be furnished by a T interconnection with the conduit 48. The cutter roller 320 is provided with a plurality of blades 330.

It will be noted the motor 326 is driven by the same air supply as is furnished to the remainder of the gun L. This provides a positive linkage between the rate of cutting and the rate of resin deposited through the nozzle means F, inasmuch as the trigger 130 will govern the supply of air to the motor 326, the supply of air to the nozzle means F and the supply of fluid to the gun L. The cut roving will therefore be dispensed in the resin spray stream at a rate directly proportional to the rate of flow of fluid dispensed from the nozzle means F.

Idler roller 321 preferably includes a resilient sleeve 343 which is rotatably supported within the chamber 295 of housing 285. The resilient sleeve 343 is mounted for direct abutment against the cutter roller 320, the blades 330 thereof being resiliently received by the sleeve 343 each time one of them abuts thereagainst. The contact of sleeve 343 with the cutter roller 320 causes rotation of the roller 321 and, inasmuch as the cutter blades 330 impress themselves within the sleeve 343, there is provided a positive drive relationship between the rollers 320 and 321.

The roller 322 is mounted for abutment against the resilient sleeve 343 of roller 321, providing a pressure abutment for engagement of the roving therebetween so that the roving will be positively pulled to within the housing 285, into cutting position.

In dispensing the roving, the same is fed through the openings 296, intermediate the sleeve 343 and the roller 321, and intermediate the sleeve 343 and the roller 320. When it is thus fed, the impetus of the roving is always toward the cutter roller 320, and each time that one of the blades 330 abuts against the sleeve 343, the strands of roving will be severed. I preferably provide a plurality of openings 296 so that separate strands of roving may be fed into the cutter. As the roving is cut by the blades 330, the cut fibers will be ejected through the opening 298 and into the resin stream issuing from the nozzle means F. The rollers are preferably driven by motor 326 at approximately 2700 r.p.m., which rotational force causes the cut roving to be forcibly ejected from the cutter so that gravitational pull will have little effect on the cut roving. This enables the operator to shoot overhead, or at any desirable angle, including an inverting of the gun. The resistance of the air met by the ejected roving prior to its entry into the resin stream causes each cut length of roving strand to separate into the individual filaments which were originally combined to form the strand.

The operation of the applicator gun L having cutter means M is substantially identical to that of the applicator gun A, the air supply and fluid supply being fed through the applicator gun L in a manner identical to that of the applicator gun A. In the modified form of applicator gun L having the cutter means M, it is additionally necessary to adjust the angular disposition of the cutter means M with respect to the spray stream issuing from the nozzle F, in order to provide the desired angular distribution of the fibers of cut roving within the streams so that the fibers will be "pre-wet" prior to the time that they are deposited on the surface which is to be coated.

Various changes in the shape, size and arrangement of parts may be made to the forms of the invention herein shown and described without departing from the spirit of the invention or the scope of the following claims.

I claim:

1. An applicator gun for the spray depositing of fluid including a main body portion having an air receiving passageway therethrough; means for supplying air under pressure to the air receiving passageway of said main body portion; a first valve means mounted upon said main body portion and extending within the air receiving passageway thereof for regulating air flow therethrough; nozzle means for the spray ejction of fluid mounted upon said main body portion, said nozzle means including a fluid receiving chamber having a spray ejecting outlet aperture and an air receiving portion intercommunicating with the air passageway of said main body portion and positioned with respect to the outlet aperture of the fluid receiving chamber of said nozzle means so that air received within said air receiving portion aids in the spray ejection of fluid therefrom; fluid supply means interconnected with the chamber of said nozzle means for supplying fluid adjacent one end of the chamber thereof; mixing valve means mounted upon said main body portion, said mixing valve means including a shaft rotatably supported by said main body portion, mixing means mounted upon said shaft and extending to within the fluid receiving chamber of said nozzle means for agitating the fluid received therewithin, said mixing means including a longitudinal body portion extendant within the chamber of said nozzle means, said longitudinal body portion having protuberances therealong and including a tortuous pathway through said protuberances from the point of interconnection of said fluid supply means with the chamber of said nozzle means to the outlet aperture of the chamber of said nozzle means, and valve means mounted upon said shaft and extending toward the outlet aperture of the chamber of said nozzle means, said valve means including a nose cone mounted upon said shaft for interfitting engagement into and out of the aperture of the chamber of said nozzle means; an air motor mounted upon said main body portion and operatively interconnected with said shaft for imparting rotation thereto; conduit means interconnecting the air passageway of said main body portion to said air motor for furnishing a motor operating supply of air thereto; second valve means mounted within the air passageway of said main body portion intermediate said first valve means and said nozzle means for providing a flow of air through said conduit means; and means for the simultaneous actuation of said first valve means and mixing valve means.

2. An applicator gun for the spray depositing of fluid including a main body portion; nozzle means for the spray ejection of fluid mounted upon said main body portion, said nozzle means including a fluid receiving chamber having an outlet aperture; fluid supply means interconnected with said nozzle means for supplying fluid thereto; valve means mounted upon said main body portion in juxtaposition for opening and closing of the outlet aperture of said nozzle means; mixing means mounted upon said main body portion, said mixing means including a body portion extendant within the fluid receiving chamber of said nozzle means, shaft means rotatably supported by said main body portion of said gun, said body portion of said mixing means being mounted on said shaft means for rotation in the fluid receiving chamber of said nozzle means, said body portion of said mixing means having helical threads thereupon with helical valleys extending between said helical threads, the crests of said threads interfitting in close fitting abutment against the walls of the chamber of said nozzle means, said helical valleys of said mixing means opening to the end of said chamber adjacent said fluid supply means and opening at the other end of said chamber adjacent the outlet aperture of said fluid receiving chamber; motor means mounted upon said main body portion of said gun; means operatively interconnecting said motor means and said shaft means for rotating said mixing means in a direction so that said helical threads exert a reverse flow force upon fluid in said fluid receiving chamber, in a direction away from the outlet aperture of said fluid receiving chamber; and pressure means operatively interconnected to said fluid receiving chamber of said nozzle means for forcing fluid through said fluid receiving chamber against the reverse flow force provided by said helical threads, said pressure means being sufficient to overpower such reverse flow force and propel fluid in said fluid receiving chamber in a direction toward the outlet aperture of said fluid receiving chamber.

3. An applicator gun for the spray depositing of fluid including a main body portion; nozzle means for the spray ejection of fluid mounted upon said main body portion, said nozzle means including a fluid receiving chamber having an outlet aperture; fluid supply means interconnected with said nozzle means for supplying fluid to said fluid receiving chamber; mixing valve means mounted upon said main body portion, said mixing valve means including mixing means for agitating the fluid received into said nozzle means from said fluid supply means and valve means for opening and closing the outlet aperture of said nozzle means, shaft means rotatably supported by said main body portion of said gun, said mixing means of said mixing valve means including a body portion extendant within the fluid receiving chamber of said nozzle means, said body portion of said mixing means being mounted on said shaft means for rotation in the fluid receiving chamber of said nozzle means, said body portion of said mixing means having helical threads thereupon with helical valleys extending between said helical threads, the crests of said threads interfitting in close fitting abutment against the walls of the chamber of said nozzle means, said helical valleys of said mixing means opening to the end of said chamber adjacent said fluid supply means and opening at the other end of said chamber adjacent the outlet aperture of said fluid receiving chamber, said valve means being mounted upon said shaft means in juxtaposition for opening and closing of the outlet aperture of said nozzle means; motor means mounted upon said main body portion of said gun; means operatively interconnecting said motor means and said shaft means for rotating said mixing means in a direction so that said helical threads exert a reverse flow force upon fluid in said fluid receiving chamber, in a direction away from the outlet aperture of said fluid receiving chamber; pressure means operatively interconnected to said fluid receiving chamber for forcing fluid through said fluid receiving chamber against the reverse flow force provided by said helical threads, said pressure means being sufficient to overpower such reverse flow force and propel fluid in said fluid receiving chamber in a direction toward the outlet aperture of said fluid receiving chamber; and means mounted upon said main body portion of said gun and operatively interconnected to said mixing valve means for the actuation of said mixing valve means.

4. An applicator gun for the spray depositing of fluid including a main body portion having an air receiving passageway therethrough; means for supplying air under pressure to the air receiving passageway of said main body portion; valve means mounted upon said main body portion and extending within the air receiving passageway thereof for regulating air flow therethrough; nozzle means for the spray ejection of fluid mounted upon said main body portion, said nozzle means including a fluid receiving chamber having a spray ejecting outlet aperture and an air receiving portion; conduit means interconnecting said means for supplying air to said applicator gun with said air receiving portion of said nozzle means in an operative relationship so that air received within said air receiving portion of said nozzle means aids in the spray ejection of fluid from said nozzle means; fluid supply means interconnected with the chamber of said nozzle means for supplying fluid adjacent one end of the chamber thereof; mixing valve means mounted upon said body portion, said mixing valve means including a shaft rotatably supported by said main body portion, mixing means mounted upon said shaft and extending to within the fluid receiving chamber of said nozzle means for agitating the fluid received therewithin, said mixing means including a longitudinal body portion extendant within the chamber of said nozzle means, said longitudinal body portion having a plurality of protuberances therealong extending outwardly from said longitudinal body portion to adjacent the wall of the chamber of said nozzle means, said protuberances extending from adjacent the point of interconnection of said fluid supply means with the chamber of said nozzle means to adjacent the outlet aperture of the chamber of said nozzle means, and valve means mounted upon said shaft and extending toward the outlet aperture of the chamber of said nozzle means, said valve means including a closure mounted upon said shaft for interfitting engagement with the aperture of the chamber of said nozzle means for opening and closing the same; an air motor mounted upon said main body portion and operatively interconnected with said shaft for imparting rotation thereto; conduit means interconnecting the air passageway of said main body portion to said air motor for furnishing a motor operating supply of air thereto; and means mounted upon said main body portion of said gun and operatively interconnected to said valve means and said mixing valve means for the actuation thereof.

5. An applicator gun for liquids including a main body portion, nozzle means mounted upon said body portion, said nozzle means including a liquid receiving chamber having an outlet aperture, liquid supply means interconnected with the liquid receiving chamber of said nozzle means for supplying liquid adjacent one end of the liquid receiving chamber thereof, mixing means, said mixing means including a shaft and agitator means mounted upon said shaft, said agitator means including a longitudinal body portion extendant within the chamber of said nozzle means, said longitudinal body portion having protuberances therealong and extending from adjacent the point of interconnection of said liquid supply means with the liquid receiving chamber of said nozzle means to adjacent the outlet aperture of the liquid receiving chamber of said nozzle means, said main body portion of said gun including a first chamber having housing means for rotatably supporting the end of said shaft adjacent said agitator means and a second chamber having housing means for rotatably supporting the end of said shaft remote from said agitator means, said first and second chambers of said main body portion being spaced apart from each other in a juxtaposed separated relationship to prevent egress of liquid from the liquid receiving chamber of said nozzle means to the second chamber of said main body portion, an air motor mounted upon said main body portion adjacent said second chamber of said main body portion and remote from said first chamber of said main body portion, said air motor being operatively interconnected with said shaft for imparting rotation thereto, and means for supplying air under pressure to said air motor.

6. An applicator gun for the spray depositing of fluid including a main body portion having an air receiving passageway therethrough; means for supplying air under pressure to the air receiving passageway of said main body portion; valve means mounted upon said main body portion and extending within the air receiving passageway thereof for regulating air flow therethrough; nozzle means for the spray injection of fluid mounted upon said main body portion, said nozzle means including a fluid receiving chamber having a spray ejecting outlet aperture and an air receiving portion; conduit means interconnecting said means for supplying air to said applicator gun with said air receiving portion of said nozzle means in an operative relationship so that air received within said air receiving portion of said nozzle means aids in the spray ejection of fluid from said nozzle means; fluid supply means interconnected with the fluid receiving chamber of said nozzle means in juxtaposition for supplying fluid adjacent one end of the fluid receiving chamber thereof; mixing means, said mixing means including a shaft and agitator means mounted upon said shaft, said agitator means including a longitudinal body portion extendant within the chamber of said nozzle means, said longitudinal body portion having protuberances therealong and extending from adjacent the point of interconnection of said fluid supply means with the fluid receiving chamber of said nozzle means to adjacent the outlet aperture of the fluid receiving chamber of said nozzle means; said main body portion of said gun including a first chamber having housing means for rotatably supporting the end of said shaft adjacent said agitator means and a second chamber having housing means for rotatably supporting the end of said shaft remote from said agitator means, said first and second chambers of said main body portion being spaced apart from each other in a juxtaposed separated relationship to prevent egress of fluid from the fluid receiving chamber of said nozzle means to the second chamber of said main body portion; an air motor mounted upon said main body portion adjacent said second chamber of said main body portion and remote from said first chamber of said main body portion, said air motor being operatively interconnected with said shaft for imparting rotation thereto; conduit means interconnecting the air passageway of said main body portion to said air motor for furnishing a motor operating supply of air thereto; and means for actuating said valve means.

7. An applicator gun for the depositing of fluid including a main body portion having an air receiving passageway therethrough; means for supplying air under pressure to the air receiving passageway of said main body portion; valve means mounted upon said main body portion and extending within the air receiving passageway thereof for regulating air flow therethrough; nozzle means for the ejection of fluid mounted upon said main body portion, said nozzle means including a fluid receiving chamber having an outlet aperture; fluid supply means interconnected with the fluid receiving chamber of said nozzle means in juxtaposition for supplying fluid adjacent one end of the fluid receiving chamber thereof; mixing means, said mixing means including a shaft and agitator means mounted upon said shaft, said agitator means including a longitudinal body portion extendant within the chamber of said nozzle means, said longitudinal body portion having protuberances therealong and extending from adjacent the point of interconnection of said fluid supply means with the fluid receiving chamber of said nozzle means to adjacent the outlet aperture of the fluid receiving chamber of said nozzle means; said main body portion of said gun including a first chamber having housing means for rotatably supporting the end of said shaft adjacent said agitator means and a second chamber having housing means for rotatably supporting the end of said shaft remote from said agitator means, said first and second chambers of said main body portion being spaced apart from each other in a juxtaposed separated relationship to prevent egress of fluid from the fluid receiving chamber of said nozzle means to the second chamber of said main body portion; an air motor mounted upon said main body portion adjacent said second chamber of said main body portion and remote from said first chamber of said main body portion, said air motor being operatively interconnected with said shaft for imparting rotation thereto; conduit means interconnecting the air passageway of said main body portion to said air motor for furnishing a motor operating supply of air thereto; and means for the actuation of said valve means.

8. An applicator gun for liquids including a main body portion; nozzle means mounted upon said main body portion, said nozzle means including a liquid receiving chamber having an outlet aperture; liquid supply means interconnected with the liquid receiving chamber of said nozzle means for supplying liquid adjacent one end of the liquid receiving chamber thereof; mixing valve means, said mixing valve means including a shaft, mixing means mounted upon said shaft and extending to within the liquid receiving chamber of said nozzle means for agitating the liquid received therewithin, said mixing means including a longitudinal body portion extendant within the liquid receiving chamber of said nozzle means, said longitudinal body portion having a plurality of protuberances therealong extending outwardly from said longitudinal body portion to adjacent the wall of the liquid receiving chamber of said nozzle means, said protuberances extending from adjacent the point of interconnection of said liquid supply means with the liquid receiving chamber of said nozzle means to adjacent the outlet aperture of the liquid receiving chamber of said nozzle means, and valve means mounted upon said shaft and extending toward the outlet aperture of the liquid receiving chamber of said nozzle means, said valve means including a closure mounted upon said shaft for interfitting engagement with the outlet aperture of the liquid receiving chamber of said nozzle means for opening and closing the same; said main body portion of said gun including a first chamber having housing means for rotatably supporting the end of said shaft adjacent said agitator means and a second chamber having housing means for rotatably supporting the end of said shaft remote from said agitator means, said first and second chamber of said main body portion being spaced apart from each other in a juxtaposed separated relationship to prevent the egress of liquid from the liquid receiving chamber of said nozzle means to the second chamber of said main body portion; an air motor mounted upon said main body portion adjacent said second chamber of said main body portion and remote from said first chamber of said main body portion, said air motor being operatively interconnected with said shaft for imparting rotation thereto; conduit means interconnected with said air motor for furnishing a motor operating supply of air thereto; valve means for regulating air flow through said conduit means; and means mounted upon said main body portion of said gun and operatively interconnected to said valve means and said mixing valve means for the actuation thereof.

References Cited in the file of this patent
UNITED STATES PATENTS

| | | |
|---|---|---|
| 1,731,953 | Thomson | Oct. 15, 1929 |
| 1,755,376 | Thompson | Apr. 23, 1930 |
| 2,739,843 | Baur | Mar. 27, 1956 |
| 2,746,484 | Flowers | May 22, 1956 |
| 2,747,603 | Klingler | May 29, 1956 |
| 2,764,565 | Hoppe et al. | Sept. 25, 1956 |
| 2,788,337 | Preiswerk et al. | Apr. 9, 1957 |
| 2,908,422 | Braun | Oct. 13, 1959 |
| 2,970,773 | Keryluk et al. | Feb. 7, 1961 |
| 2,995,173 | Nawalanic | Aug. 8, 1961 |
| 3,027,096 | Giordano | Mar. 27, 1962 |
| 3,029,027 | Gray | Apr. 10, 1962 |
| 3,035,775 | Edwards et al. | May 22, 1962 |
| 3,079,090 | Decker | Feb. 26, 1963 |